(12) United States Patent
Wireman et al.

(10) Patent No.: US 10,934,099 B2
(45) Date of Patent: Mar. 2, 2021

(54) ELECTRIC PALLET CONVEYOR

(71) Applicants: Brad Wireman, Rochester Hills, MI (US); G. Scott Kreft, Morrisville, NC (US)

(72) Inventors: Brad Wireman, Rochester Hills, MI (US); G. Scott Kreft, Morrisville, NC (US)

(73) Assignees: Caromation, Inc., Raleigh, NC (US); Straightline Automation, LLC, Rochester Hills, MI (US)

( * ) Notice: Subject to any disclaimer, the term of this patent is extended or adjusted under 35 U.S.C. 154(b) by 194 days.

(21) Appl. No.: 16/401,851

(22) Filed: May 2, 2019

(65) Prior Publication Data

US 2019/0337727 A1  Nov. 7, 2019

Related U.S. Application Data

(60) Provisional application No. 62/665,897, filed on May 2, 2018.

(51) Int. Cl.
| | |
|---|---|
| *B65G 35/00* | (2006.01) |
| *B65G 35/06* | (2006.01) |
| *B65G 17/00* | (2006.01) |
| *B65G 19/02* | (2006.01) |
| *B61B 13/12* | (2006.01) |
| *B65G 54/02* | (2006.01) |

(52) U.S. Cl.
CPC ............ *B65G 35/06* (2013.01); *B61B 13/125* (2013.01); *B65G 17/002* (2013.01); *B65G 19/02* (2013.01); *B65G 54/02* (2013.01)

(58) Field of Classification Search
CPC .... B65G 17/002; B65G 17/005; B65G 17/12; B65G 17/42; B65G 19/02; B65G 35/00; B65G 35/06; B65G 54/02; B23Q 7/1436; B61B 13/125
USPC .......................................... 198/465.1, 465.3
See application file for complete search history.

(56) References Cited

U.S. PATENT DOCUMENTS

| | | | | |
|---|---|---|---|---|
| 3,358,611 A | * | 12/1967 | Westfall ............... | B23Q 7/1436 |
| | | | | 104/120 |
| 3,556,013 A | * | 1/1971 | Kruer ........................ | B61C 5/00 |
| | | | | 104/157 |
| 3,777,669 A | * | 12/1973 | Lott ....................... | B65G 35/06 |
| | | | | 104/130.07 |
| 3,854,889 A | * | 12/1974 | Lemelson .............. | B23Q 41/00 |
| | | | | 29/33 P |
| 4,800,818 A | * | 1/1989 | Kawaguchi ............ | H02K 41/02 |
| | | | | 104/290 |

(Continued)

*Primary Examiner* — Joseph A Dillon, Jr.
(74) *Attorney, Agent, or Firm* — Panagos, Kennedy PLLC; Daniel Checkowsky; Linda Kennedy

(57) ABSTRACT

An electric pallet conveyor includes a slide moveably supported on a guide-rail of a track. The electric pallet includes a motor for propelling the slide along the guide rail. A first gear pulley is attached to the slide and rotatable about a first gear pulley axis of rotation in response to a rotational torque output from the motor. A second gear pulley displaced from the first gear pulley is rotatable about a second gear pulley axis of rotation. A pulley belt connects the first gear pulley to the second gear pulley and is operable for transferring a rotational torque from the first gear pulley to the second gear pulley. A drive pulley fixedly attached to the second gear pulley engages a drive rail of the track to propel the slide along the guide-rail.

19 Claims, 12 Drawing Sheets

(56) References Cited

U.S. PATENT DOCUMENTS

| | | | | | |
|---|---|---|---|---|---|
| 4,940,000 | A * | 7/1990 | Horvath | | B23Q 7/1436 104/252 |
| 4,987,834 | A * | 1/1991 | Peck, Jr. | | B23Q 7/1436 104/128 |
| 5,007,783 | A * | 4/1991 | Matsuo | | B23Q 7/1426 414/222.05 |
| 5,388,684 | A * | 2/1995 | Peck | | B65G 35/06 198/465.1 |
| 5,412,863 | A * | 5/1995 | Prodel | | B23Q 7/1436 29/33 P |
| 5,551,552 | A * | 9/1996 | Ophardt | | B05B 13/0221 198/465.1 |
| 5,595,121 | A * | 1/1997 | Elliott | | B61B 13/00 104/53 |
| 5,658,120 | A * | 8/1997 | Watanabe | | B23Q 7/1436 414/495 |
| 5,960,938 | A * | 10/1999 | Clopton | | B61B 10/022 198/838 |
| 7,014,033 | B2 * | 3/2006 | Sticht | | B65G 35/06 198/345.3 |
| 7,381,022 | B1 * | 6/2008 | King | | B65G 1/0492 187/270 |
| 8,628,289 | B1 * | 1/2014 | Benedict | | B65G 1/0478 414/234 |
| 8,919,532 | B2 * | 12/2014 | Buergermeister | | B65G 35/06 198/465.1 |
| 8,944,238 | B2 * | 2/2015 | Baechle | | B65G 17/485 198/577 |
| 9,909,656 | B2 * | 3/2018 | Suzuki | | B65G 17/12 |
| 9,957,110 | B2 * | 5/2018 | Kaeser | | B65G 17/12 |
| 10,138,070 | B2 * | 11/2018 | Li | | B65G 35/06 |
| 10,308,446 | B2 * | 6/2019 | Spotti | | H01L 21/67724 |
| 10,745,203 | B2 * | 8/2020 | Tomoda | | B60L 13/03 |
| 2004/0168893 | A1 * | 9/2004 | Brixius | | B65G 21/22 198/837 |
| 2004/0247416 | A1 * | 12/2004 | Komatsu | | B65G 47/901 414/222.1 |
| 2005/0284326 | A1 * | 12/2005 | Leisner | | B65G 17/002 104/91 |
| 2007/0000756 | A1 * | 1/2007 | Tabler | | B61B 13/125 198/465.3 |
| 2007/0041819 | A1 * | 2/2007 | Komatsu | | B65G 35/06 414/564 |
| 2008/0289450 | A1 * | 11/2008 | Fischer | | B65G 17/12 75/707 |
| 2009/0078535 | A1 * | 3/2009 | Tabler | | B65G 35/063 198/465.3 |
| 2009/0223780 | A1 * | 9/2009 | Krups | | B65G 17/002 198/474.1 |
| 2009/0233515 | A1 * | 9/2009 | Kisoda | | H01J 9/46 445/73 |
| 2009/0260955 | A1 * | 10/2009 | Krups | | B61B 13/00 198/793 |
| 2013/0075227 | A1 * | 3/2013 | Robbin | | B62D 65/18 198/465.1 |
| 2014/0014468 | A1 * | 1/2014 | Pilarz | | B65G 17/345 198/370.03 |
| 2014/0209432 | A1 * | 7/2014 | Franck | | B65G 17/12 198/418 |
| 2015/0034461 | A1 * | 2/2015 | Hecht | | G01N 35/04 198/867.01 |
| 2015/0303663 | A1 * | 10/2015 | Wall | | H02G 1/02 182/36 |
| 2016/0237690 | A1 * | 8/2016 | Hyde | | E05F 15/74 |
| 2018/0362055 | A1 * | 12/2018 | Millar | | B61C 3/00 |
| 2019/0047799 | A1 * | 2/2019 | Spotti | | H01L 21/67724 |
| 2019/0049099 | A1 * | 2/2019 | Baker | | F21V 21/34 |
| 2019/0248585 | A1 * | 8/2019 | Watzal | | B65G 35/06 |
| 2019/0367290 | A1 * | 12/2019 | Papsdorf | | B65G 17/002 |
| 2020/0003257 | A1 * | 1/2020 | Neufeld | | H02K 41/031 |
| 2020/0102161 | A1 * | 4/2020 | Ragan | | B65G 54/02 |
| 2020/0180868 | A1 * | 6/2020 | Hasegawa | | B65G 35/06 |
| 2020/0255224 | A1 * | 8/2020 | Stronkhorst | | B65G 47/844 |
| 2020/0317062 | A1 * | 10/2020 | Gurevich | | B61C 13/04 |

* cited by examiner

SECTION 5-5

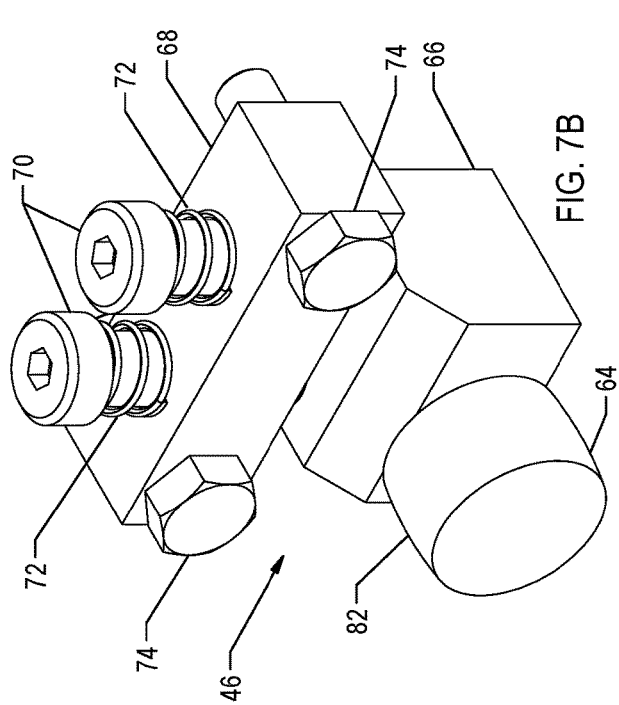
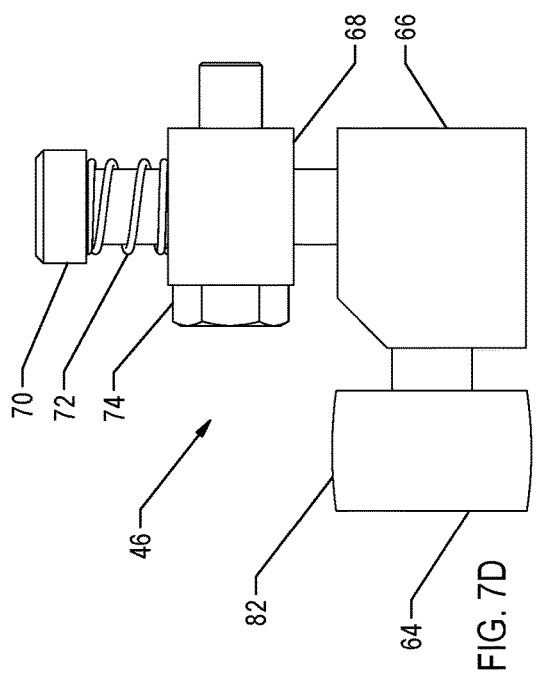
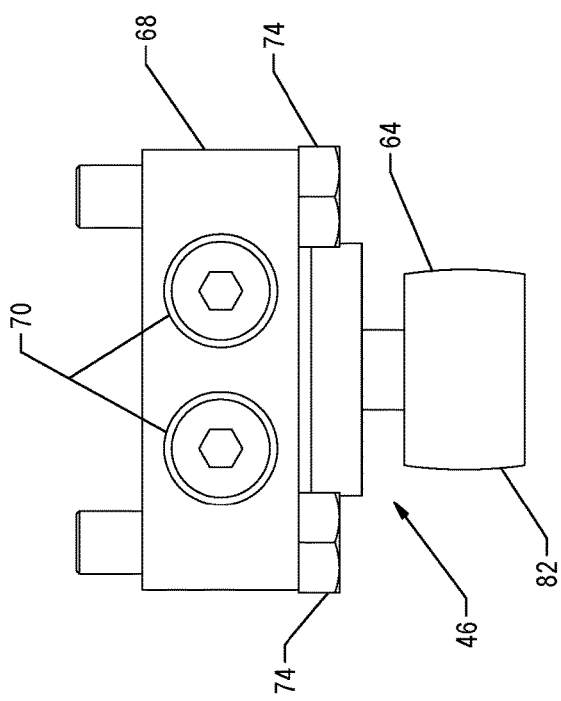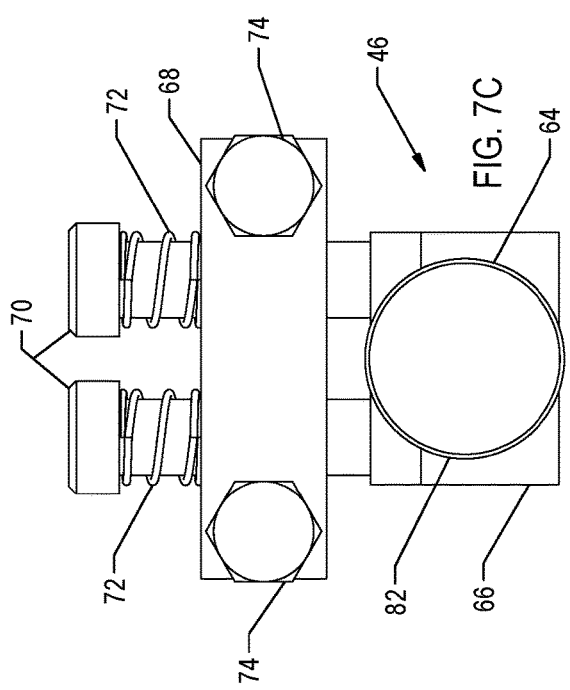
FIG. 7A
FIG. 7B
FIG. 7C
FIG. 7D

SECTION 10-10

SECTION 12-12

ELECTRIC PALLET CONVEYOR

RELATED APPLICATIONS

This application claims the benefit of U.S. Provisional Application No. 62/665,897, entitled Electric Pallet Conveyor, filed on May 2, 2018, which is herein incorporated by reference in its entirety.

BACKGROUND

Conveyor systems are employed in various manufacturing operations to move materials from one location to another. Conveyor systems provide quick and efficient transportation for a wide variety of materials and may be used in applications involving the transportation of heavy or bulky materials. Conveyors are able to safely transport materials from one location to another, which when done by human labor could be strenuous and expensive.

Many types of conveying systems are available and used according to the particular needs of various industries and applications. There are a variety of options available for running conveying systems, including hydraulic, mechanical and fully automated systems, which may be equipped to fit individual needs. For example, an electric track vehicle system is a conveyor system that utilizes independently driven vehicles traveling on a monorail track network to transport payloads both vertical and horizontal between stations. The monorail track may include straight track elements, bends, curves and transfer-units for changing travel direction. An electric track vehicle system may be designed as simple as a single vehicle operating on a single track or can utilize multiple vehicles delivering to multiple stations simultaneously on a loop type network of track.

SUMMARY

Disclosed is an electric pallet conveyor operable for transporting an object along a track. The electric pallet conveyor may include a slide configured to transport objects along the track. The slide may be moveably attached to an electric pallet conveyor that guides the slide along the track. The electric pallet conveyor system may include a self-contained drive system for propelling the slide along the electric pallet conveyor. The drive system may include a motor for generating a rotational torque and a power supply for operating the motor. A drivetrain operably connects the motor to the electric pallet conveyor to move the slide along the track. The drivetrain operates to convert rotational torque produced by the motor to a linear force that may be used to propel the slide along the electric pallet conveyor. A controller may be used to control operation of the motor.

BRIEF DESCRIPTION OF THE DRAWINGS

The various features, advantages and other uses of the present apparatus will become more apparent by referring to the following detailed description and drawings, in which:

FIGS. 7A-7D are views of a guide block that may be employed with the electric pallet conveyor system;

DETAILED DESCRIPTION

Figure 1:
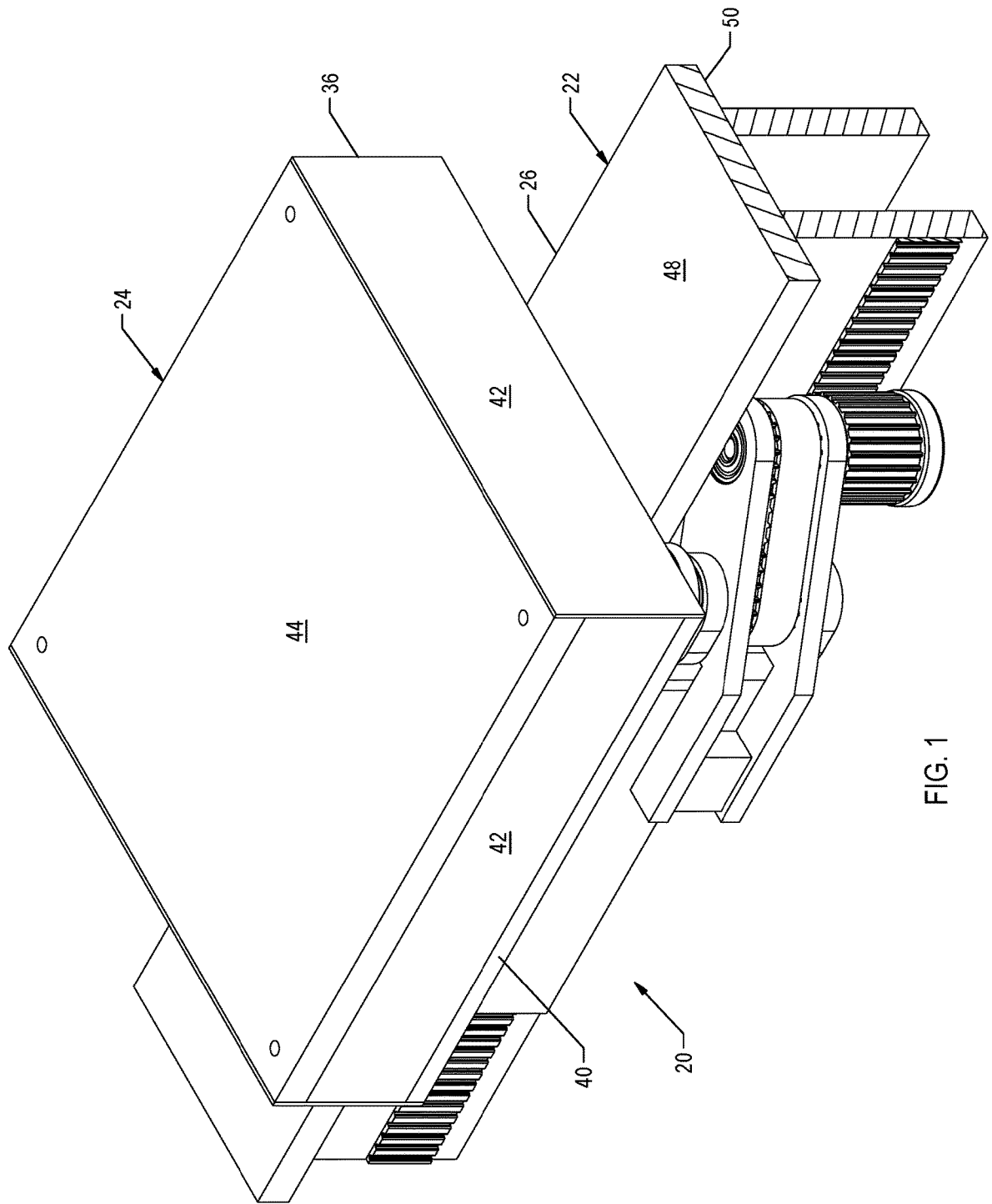
FIG. 1 is a perspective view of an electric pallet conveyor system.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive, or otherwise limit, or restrict the claims to the precise forms and configurations shown in the drawings and disclosed in the following detailed description.

Figure 2:
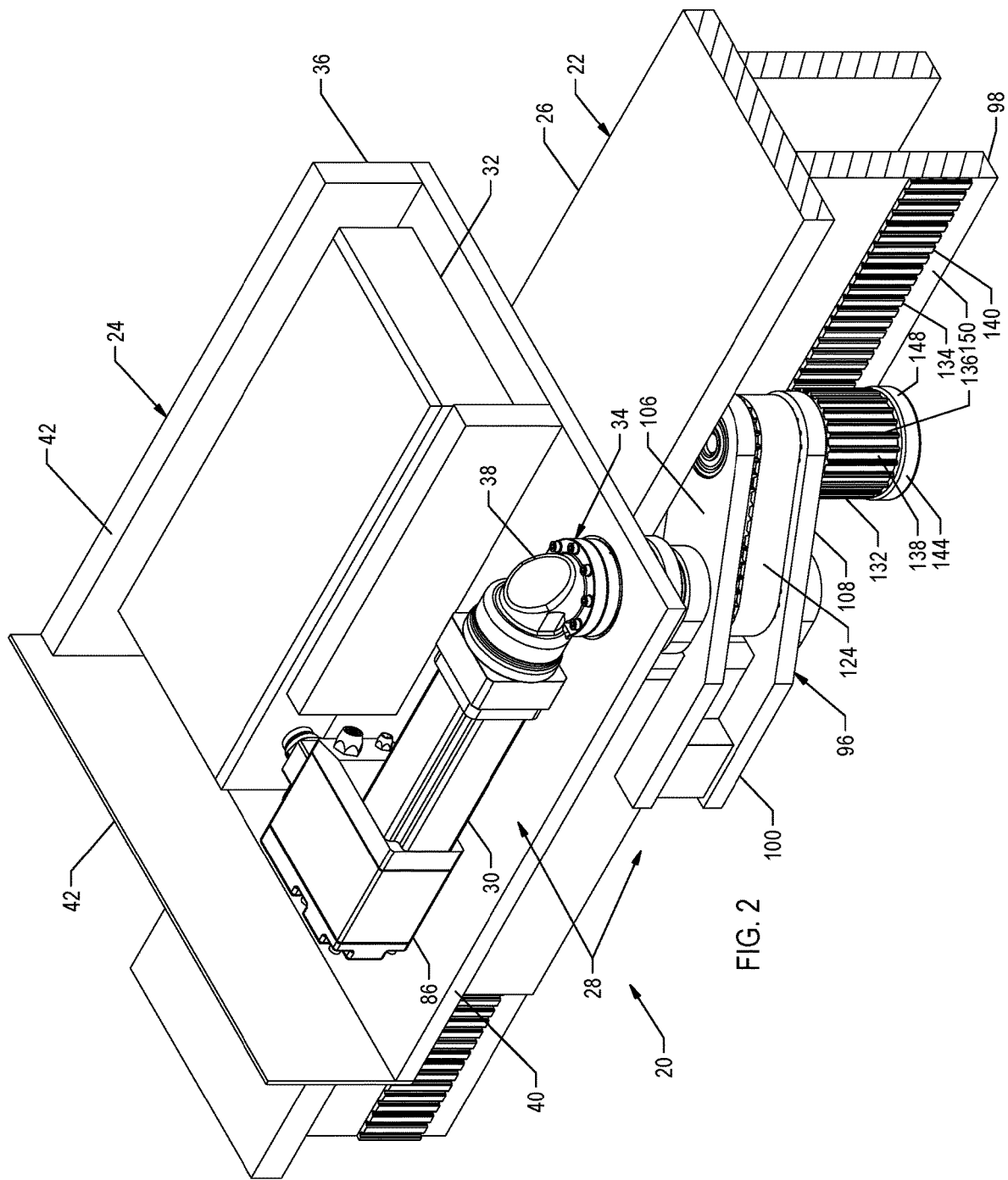
FIG. 2 is a perspective view of the electric pallet conveyor system with a cover and two sidewalls of a slide housing removed for clarity.
Figure 3:
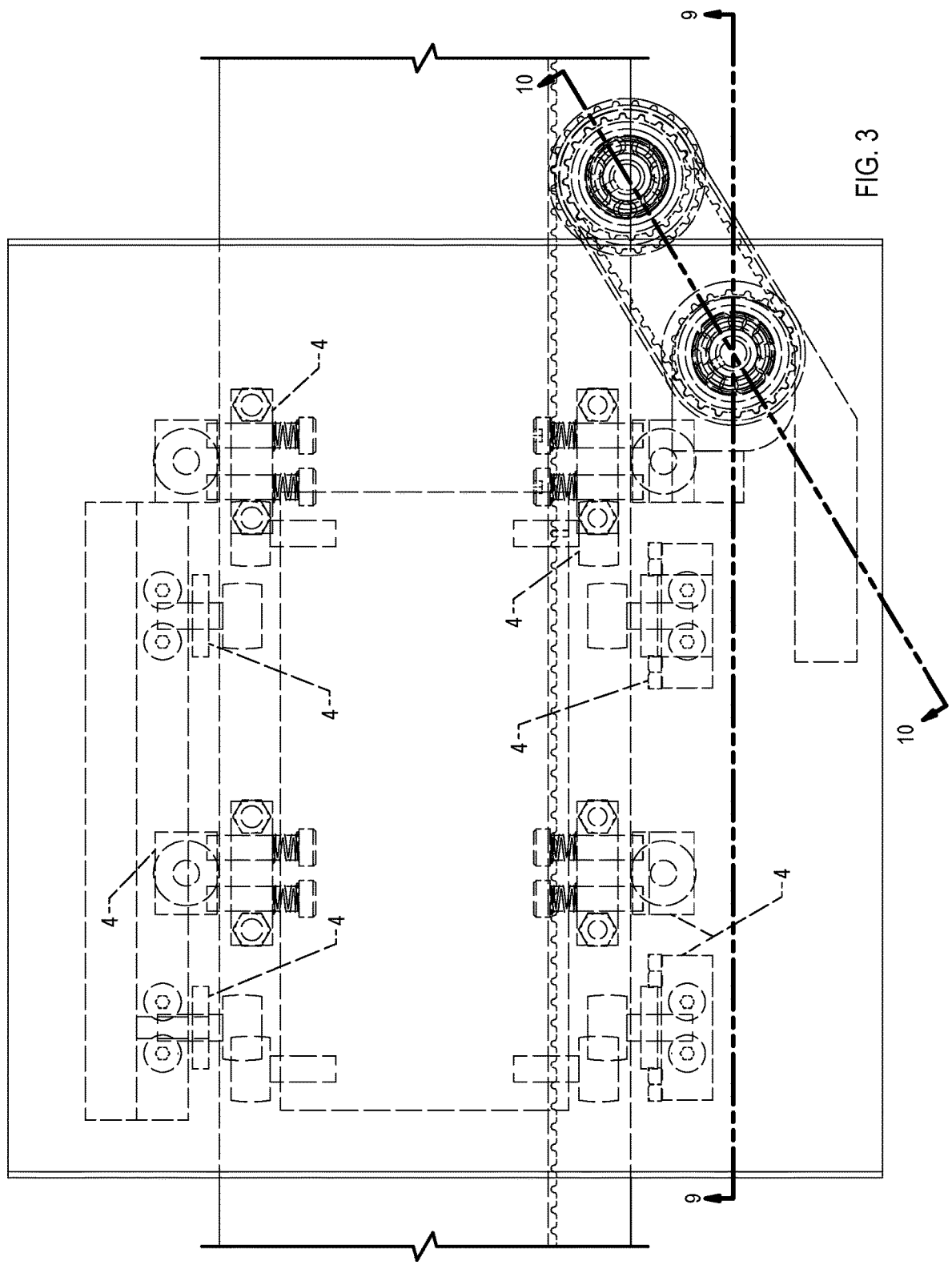
FIG. 3 is a top elevational view of the electric pallet conveyor system.
Figure 4:
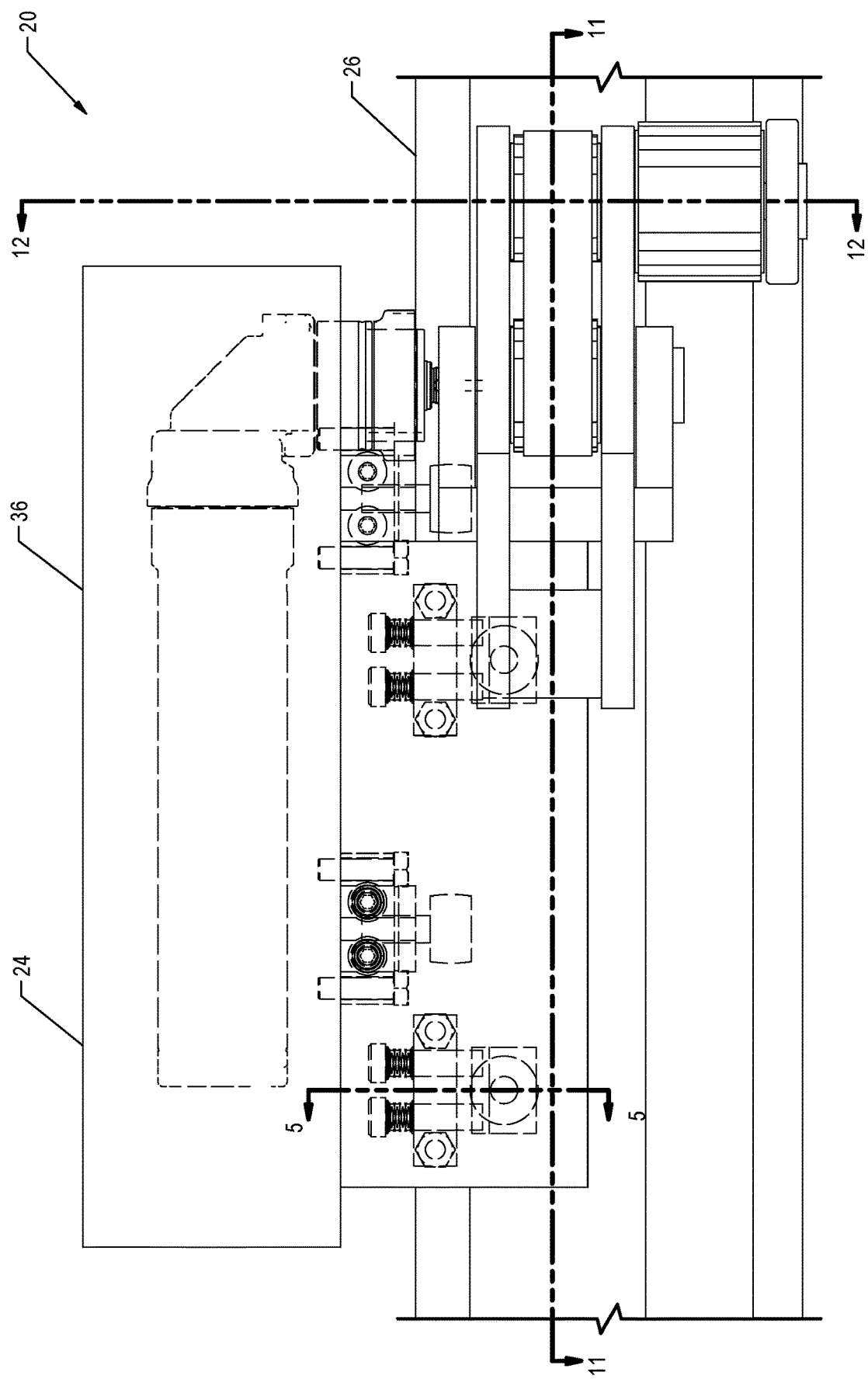
FIG. 4 is a side elevational view of the electric pallet conveyor system.

With reference to FIGS. 1-2, an electric pallet conveyor system 20 may be configured to transport various objects, such as a workpiece, along a track 22. The electric pallet conveyor system 20 may include a slide 24 configured to transport objects along the track 22. The slide 24 may be moveably attached to an guide-rail 26 that guides the slide 24 along the track 22. The electric pallet conveyor system 20 may include a self-contained drive system 28 for propelling the slide 24 along the guide-rail 26. The drive system 28 may include a motor 30 for generating a rotational torque and a power supply 32 for operating the motor 30. A drivetrain 34 may be used to operably connect the motor 30 to the track 22 and move the slide 24 along the guide-rail 26.

The slide 24 may include a slide housing 36 that encloses at least a portion of the drive system 28. For example, the slide housing 36 may be configure to enclose the motor 30, power supply 32, a controller 86 and a gearbox 38 used for conditioning the rotational torque produced by the motor 30. The slide housing 36 may have any of various shapes and sizes to accommodate the components enclosed within the housing. In the illustrated example, the slide housing 36 has a generally rectangular shape, but in practice may include other shapes and configurations to accommodate a particular application. In this particular example, slide housing 36 may include a housing base 40 and one or more housing sidewalls 42 attached to and extending generally upward from the housing base 40. A housing cover 44 may be attached to one or more of the housing sidewalls 42 opposite the housing base 40.

The slide housing 36 may be configured to accommodate a particular object to be transported on the slide 24. For example, various fixtures, clamps, carriers, etc., may be employed for securing an object, such as a workpiece, to the slide 24. The fixturing devices may be attached to the housing cover 44 or another portion of the slide housing 36.

With reference to FIGS. 3-6 and 7A-7D, the slide 24 may be moveably attached to the guide-rail 26 using one or more guide blocks 46. The guide-rail 26 may have a generally plate-like configuration. In the illustrated example, the guide-rail 26 is configured as a plate having a generally rectangular cross-section. The guide-rail 26 may be arranged horizontally on its side, such that a dimensionally longer top surface 48 and bottom surface 50 are oriented horizontally, and a dimensionally shorter edge surface 52 are oriented generally vertically. This arrangement of the guide-rail 26 can rotated to any configuration. The guide-rail 26 is shown to have a generally rectangular cross-section shape, but in practice, may have various other configurations. For example, the guide-rail 26 may include two separate rails arranged adjacent and parallel to one another. The guide-rail 26 may also have a different cross-sectional shape. The guide-rail 26 may be straight or curved along its axis to conform to the particular path of the track 22. The track 22 may be made up of a single guide-rail 26 or multiple electric pallet conveyors arranged end-to-end.

Figure 5:
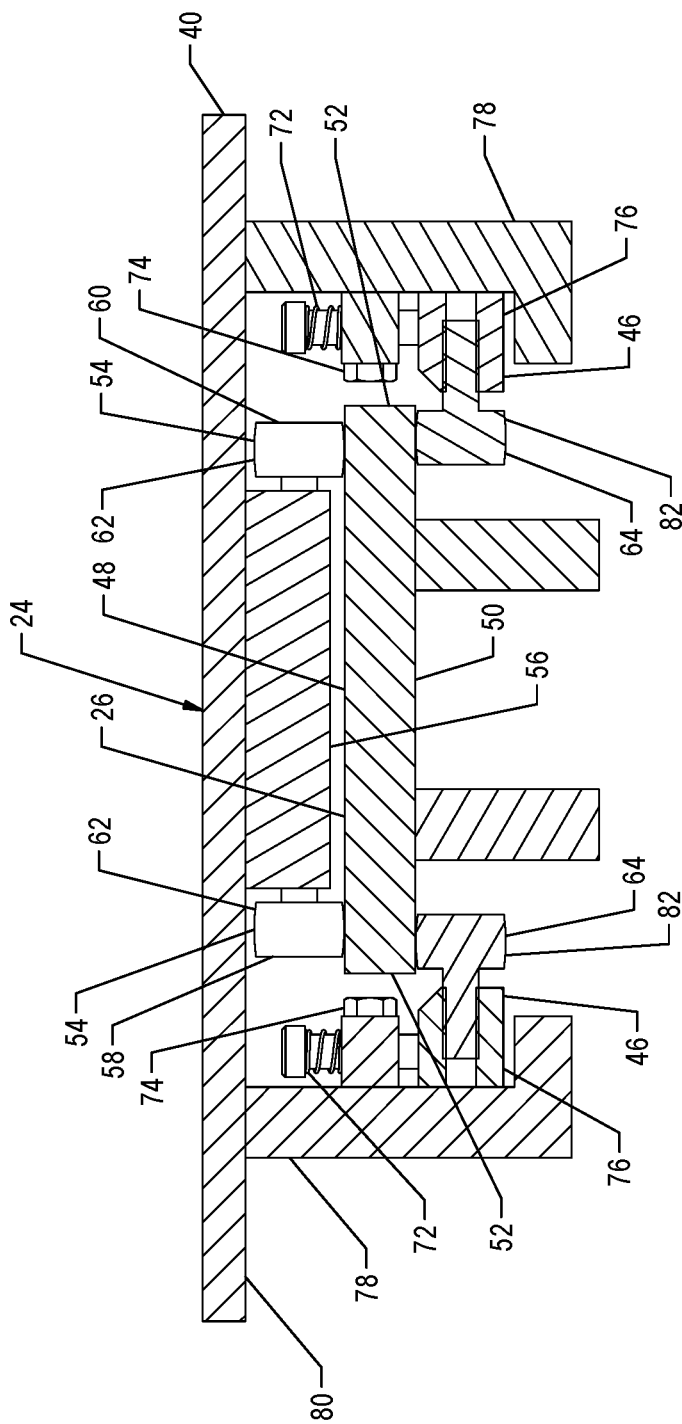
FIG. 5 is partial cross-sectional view of the electric pallet conveyor system taken along section line 5-5 in FIG. 4.

With reference to FIG. 5, the slide 24 may be supported on the guide-rail 26 by one or more upper rollers 54. The upper rollers 54 may be rotatably attached to a roller mounting block 56 connected to the housing base 40. In the illustrated example, a first upper roller 58 is rotatably attached to one side of the roller mounting block 56 and a second upper roller 60 is rotatably attached to an opposite side of the roller mounting block 56. An outer circumference 62 of each upper roller 54 engages the top surface 48 of the guide-rail 26. Multiple upper roller 54 may be employed to support the slide 24 on the guide-rail 26.

Depending on the particular application, a device configured differently than upper roller 54 may be used to support the slide 24 on the guide-rail 26. For example, one or more slide-blocks may be used to support the slide 24 on the guide-rail 26. The slide-blocks may be made of various materials, including metals, polymers and composites, as well as other materials, and may include self-lubricating materials. The slide-block may be configured to slide along the top surface 48 of the guide-rail 26. A suitable lubricant may be used to lubricate the interface between the slide-blocks and guide-rail 26 to minimize friction.

With reference to FIGS. 5 and 7A-7D, one or more guide blocks 46 may be used to limit vertical and horizontal movement of the slide 24 relative to the guide-rail 26 and ensure that the upper rollers 54 remain in contact with the top surface 48 of the guide-rail 26. With particular reference to FIGS. 7A-7D, each guide block 46 may include a roller 64 rotatably attached to a guide block housing 66. The guide block housing 66 may be moveably attached relative to a guide block connector 68 using one or more threaded fasteners 70. The threaded fasteners 70 may fixedly engage correspondingly threaded apertures in the guide block housing 66 and slideably engage apertures in the guide block connector 68. The guide block housing 66 and fastener 70 are free to move axially relative to the guide block connector 68. A biasing member 72, such as a coil spring, may be used to bias the guide block housing 66 toward the guide block connector 68. One of more fasteners 74 may be used to connect the guide block 46 to the slide 24.

With particular reference to FIGS. 5 and 7A-7D, one more guide blocks 46 may be fixedly attached as a lower guide block 76 to a slide support bracket 78 fixedly attached to a lower surface 80 of the housing base 40. The lower guide block 76 may have substantially the same configuration as guide block 46. The lower guide blocks 76 operate to minimize vertical movement of the slide 24 relative to the guide-rail 26 by helping ensure that contact is maintained between the upper rollers 54 and the top surface 48 of the guide-rail 26. The slide support bracket 78 may extend generally vertically downward from the housing base 40. The lower guide block 76 may be attached to a side of the slide support bracket 78 using the fasteners 74. The lower guide block 76 may be located such that an outer circumference 82 of roller 64 engages the bottom surface 50 of the guide-rail 26. The biasing member 72 biases the roller 64 into engagement with the bottom surface 50 of the guide-rail 26, thereby trapping the guide-rail 26 between the upper rollers 54 and the roller 64 of the lower guide block 76.

With continued reference to FIGS. 6 and 7A-7D, one or more guide blocks 46 may be fixedly attached as a horizontal guide block 84 to the bottom surface 80 of the housing base 40. The horizontal guide blocks 84 operate to control horizontal movement of the slide 24 relative to the guide-rail 26. The horizontal guide block 84 may be fixedly attached to the bottom surface 80 of the housing base 40 using the fasteners 74. The horizontal guide block 84 may be located such that the outer circumference 82 of the roller 64 engages the edge surface 52 of the guide-rail 26. The biasing member 72 biases the roller 64 into engagement with the edge surface 52 of the guide-rail 26. A pair of horizontal guide blocks 84 may be located on opposite sides of the guide-rail 26 to help maintain a horizontal position of the slide 24 relative to the guide-rail 26. Multiple horizontal guide blocks 84 may be employed to control the horizontal position of the slide 24 relative to the guide-rail 26.

With reference to FIG. 2, the slide 24 may be propelled along the track 22 by the drive system 28. The drive system 28 may include the motor 30 configured to output a rotational torque. The motor 30 may be configured as an electric motor capable of being powered by a DC electric current. Power for operating the motor may be supplied by power supply 32, which may be configured as a battery. The controller 86 may be used to control operation of the motor 30, such as, for example, by controlling a flow of electric current from the power supply 32 to the motor 30.

Figure 9:
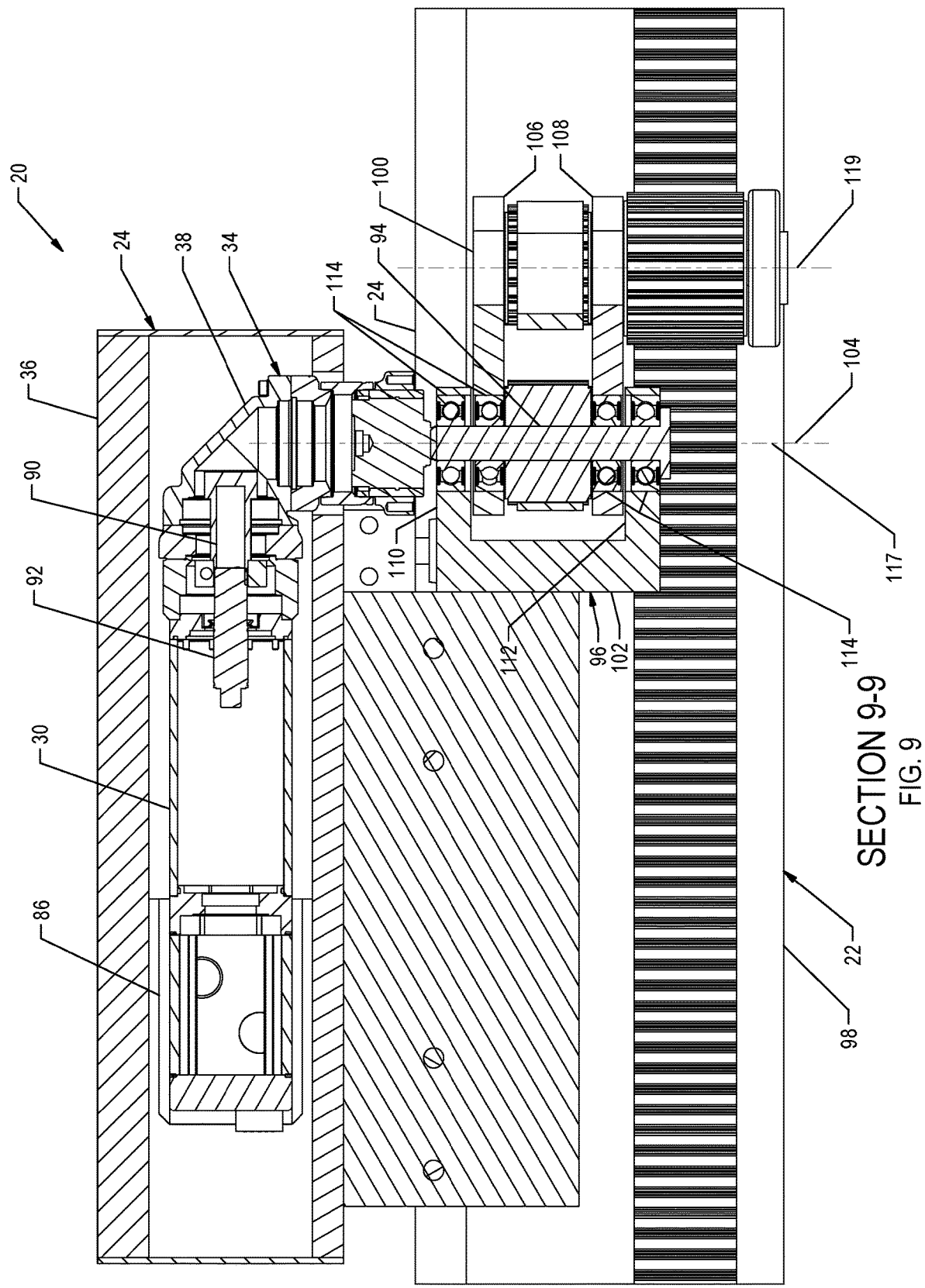
FIG. 9 is partial cross-sectional view of the electric pallet conveyor system taken along section line 9-9 in FIG. 3.

With reference to FIGS. 2 and 9, the drive system 28 may include the drivetrain 34 for converting rotational torque produced by the motor 30 to a linear force that may be used to propel the slide 24 along the guide-rail 26. The drivetrain 34 may include the gearbox 38 for conditioning the torque output from the motor 30 to achieve a desired rotational speed and/or rotational torque. An input 90 of the gearbox 38 may be attached to an output shaft 92 of the motor 30. The gearbox 38 may include various combinations of gears as may be required to obtain a desired output for a particular application.

The gearbox 38 may output a rotation a torque that may be input into a pivot shaft 94 of a pivot mechanism 96. The pivot mechanism 96 may be located external of the slide housing 36, whereas the other components of the drive system, such as the motor 30, controller 86, power supply 32 and gearbox 38, may be located partially or entirely within the slide housing 36. Alternatively, some or all of the drive system components may be located outside of the slide housing 36. All of the drive system 28 components may be directly or indirectly attached to, or associated with, the slide 24 to move as a single unit along the electric pallet conveyor.

The pivot mechanism 96 engages a drive-rail 98 of the track 22 to transmit a linear drive force to the drive-rail 98 to propel the slide 24 along the guide-rail 26. The pivot mechanism 96 may include a pivot arm 100 pivotally attached to a pivot bracket 102 attached to the slide housing 36. The pivot arm 100 may be pivoted around a pivot axis 104. The pivot arm 100 may be configured to include an upper pivot arm 106 and a lower pivot arm 108 spaced apart from the upper pivot arm 106. The upper pivot arm 106 may be positioned adjacent an upper arm 110 of the pivot bracket 102 and the lower pivot arm 108 may be position adjacent a lower arm 112 of the pivot bracket 102, such that the upper and lower pivot arms 106,108 are located between the upper and lower arms 110,112 of the pivot bracket 102.

The upper pivot arm 106 and the lower pivot arm 108 may each include a bearing 114 mounted in an aperture formed in the respective pivot arm. A bearing axis of rotation may be substantially aligned with the pivot axis 104 of the pivot arm 100. The upper arm 110 and lower arm 112 of the pivot bracket 102 may similarly include a bearing 114 mounted in apertures formed in the respective arms of the pivot bracket 102. The bearings 114 mounted in the pivot bracket 102 also have their respective axis of rotation substantially aligned with the pivot axis 104.

Figure 10:
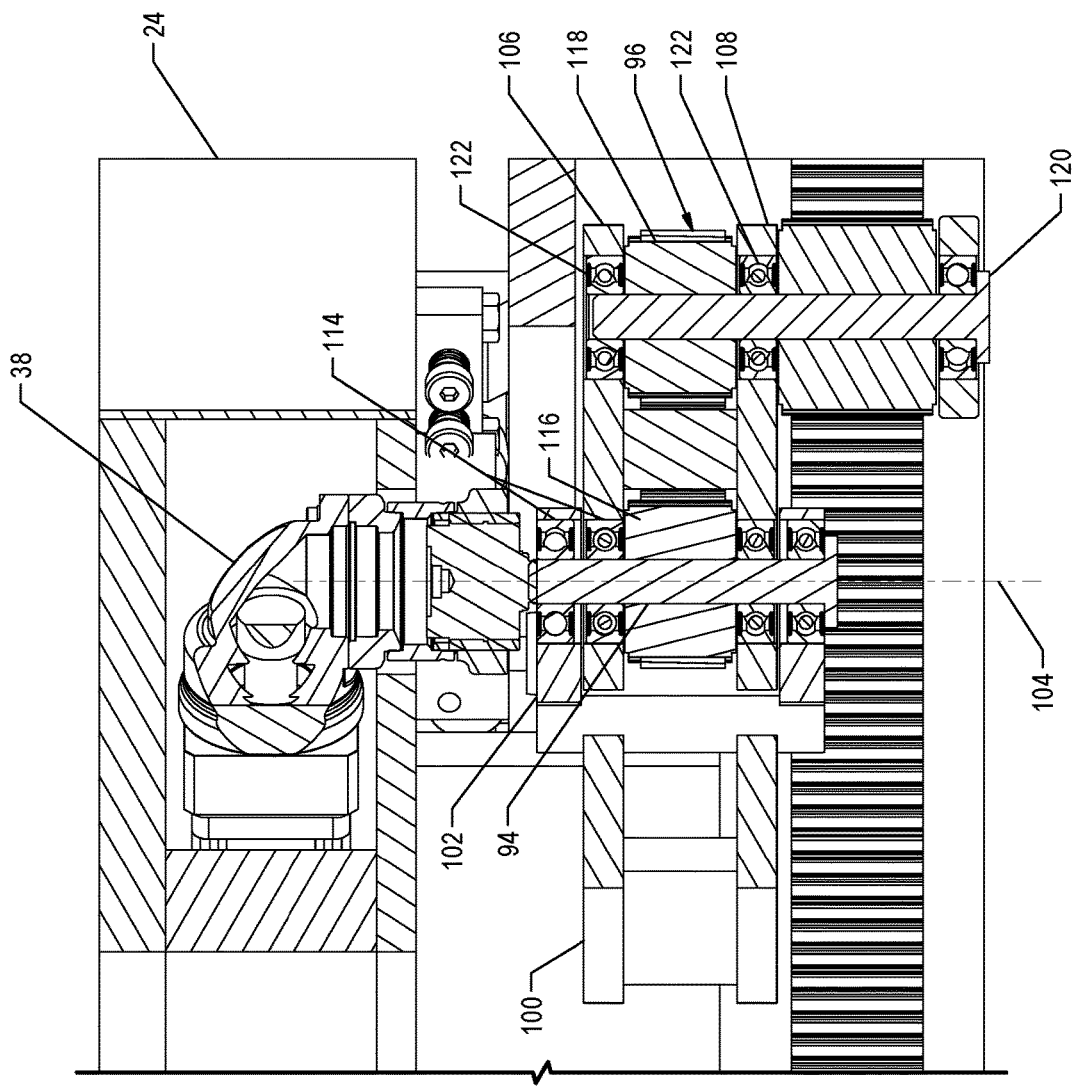
FIG. 10 is partial cross-sectional view of the electric pallet conveyor system taken along section line 10-10 in FIG. 3.
Figure 11:
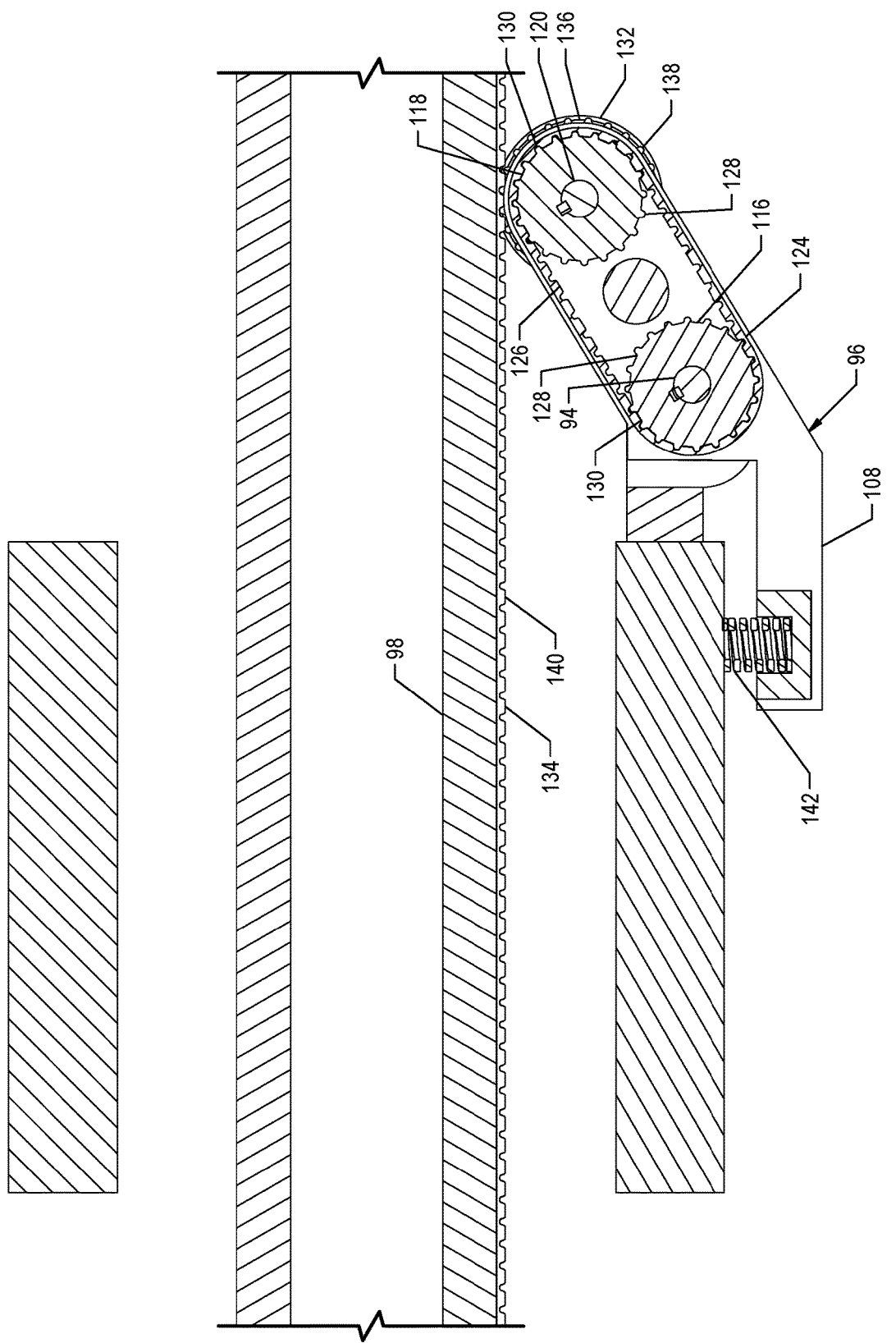
FIG. 11 is a partial cross-sectional view of the electric pallet conveyor system taken along section line 11-11 in FIG. 4.
Figure 12:
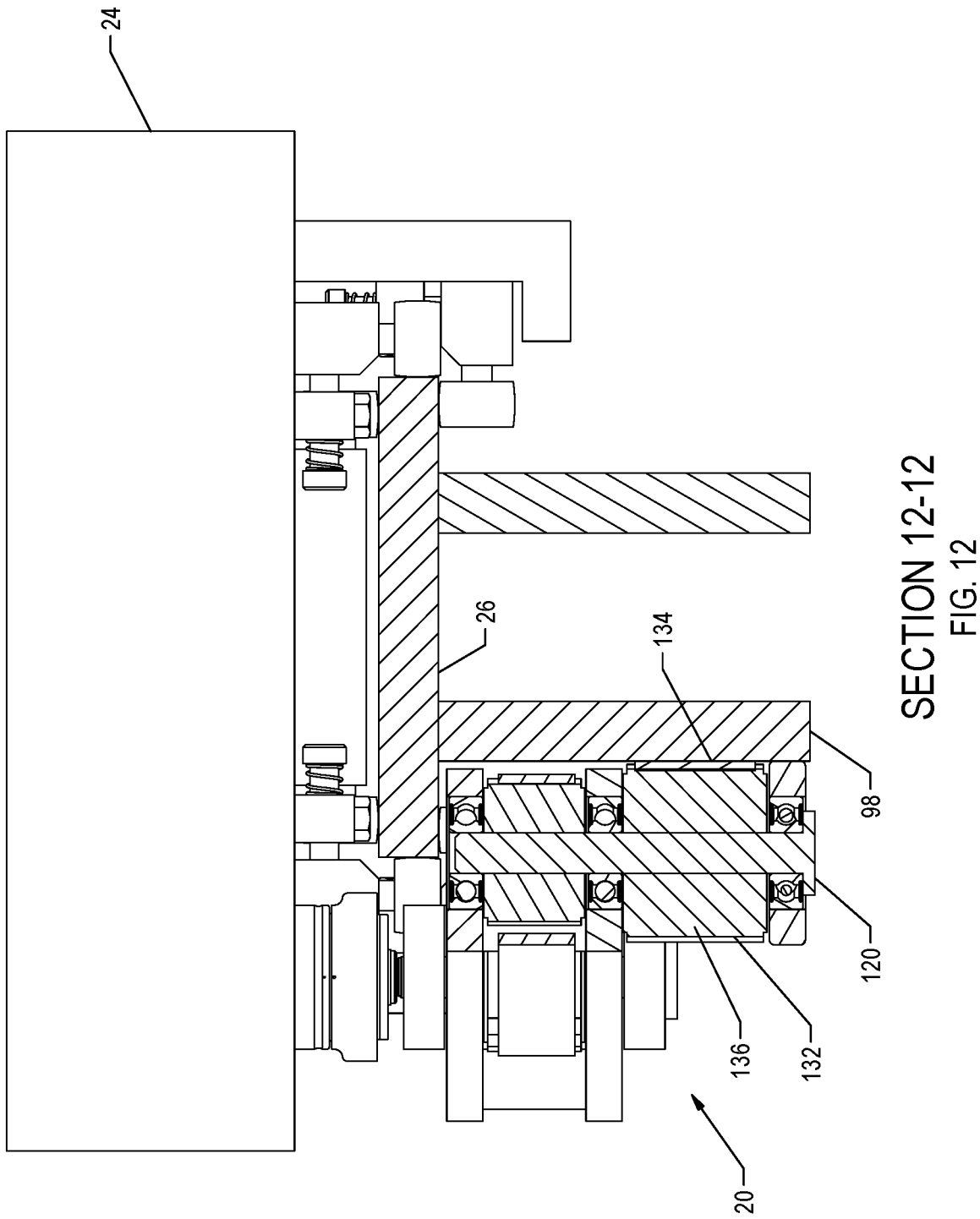
FIG. 12 is a partial cross-sectional view of the electric pallet conveyor system taken along section line 12-12 in FIG. 4.

With reference to FIGS. 10 and 11, the pivot mechanism 96 may include a first gear pulley 116 rotatably disposed between the upper pivot arm 106 and the lower pivot arm 108. An axis of rotation 117 of the first gear pulley 116 may be substantially aligned with the pivot axis 104. The first gear pulley 116 may be mounted on the pivot shaft 94 that is rotatable about its longitudinal axis. The first gear pulley 116 and the pivot shaft 94 may be configured to rotate in unison. The pivot shaft 94 extends through the bearings 114 in the pivot arm 100 and the pivot bracket 102. The pivot shaft 94 may be used to pivotally connect the pivot arm 100 to the pivot bracket 102. An end of the pivot shaft 94 may be operably connected to an output of the gearbox 38 to cause the first gear pulley 116 to rotate about its longitudinal axis in response to a rotational torque output from the motor 30 (see for example FIG. 2).

The pivot mechanism 96 may include a second gear pulley 118 rotatably mounted to the pivot arm 100 and spaced a distance from the first gear pulley 116. An axis of rotation 119 of the second gear pulley 118 may be aligned substantially parallel to the pivot axis 104, which may also coincide with the axis of rotation 117 of the first gear pulley 116. The second gear pulley 118 may be attached to a drive shaft 120 supported by bearings 122 mounted in apertures formed in the upper pivot arm 106 and lower pivot arm 108 of the pivot arm 100. A longitudinal axis of the drive shaft 120 may be co-axially aligned with the axis of rotation 119 of the second gear pulley 118. The drive shaft 120 and second gear pulley 118 may rotate concurrently about their respective axis of rotation.

Figure 8:
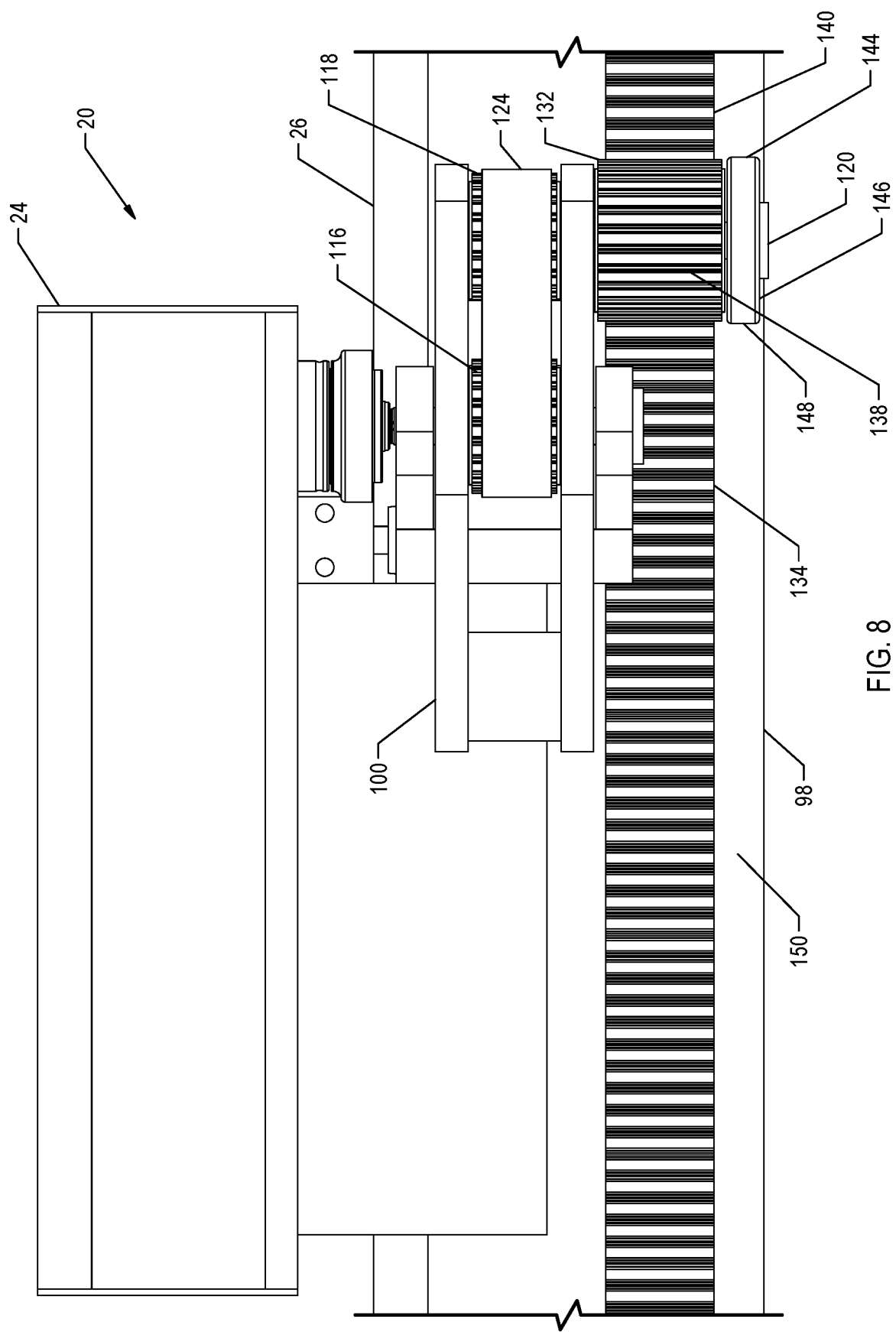
FIG. 8 is side elevational view of the electric pallet conveyor system.

With reference to FIGS. 2, 8 and 11, the first pulley gear 116 may be operably coupled to the second pulley gear 118 by a pulley belt 124. The pulley belt 124 operates to transfer rotational torque from the first pulley gear 116 to the second pulley gear 118. The pulley belt 124 may include lugs 126 that engage corresponding lugs 128 formed along an outer circumference 130 of each of the first pulley gear 116 and the second pulley gear 118. Other belt/pulley configurations may also be employed depending on the design objectives of a particular application. For example, the first pulley gear 116 and the second pulley gear 118 may be configured as sprockets with a chain interconnecting the two pulley gears. The first pulley gear 116 and the second pulley gear 118 may also be configured for use with a V-belt or a belt having a different cross-sectional shape.

With reference to FIGS. 2, 8, 11 and 12, the pivot mechanism 96 may include a drive pulley 132 that engages a drive belt 134 mounted to the drive-rail 98. The drive pulley 132 may be fixedly mounted to the drive shaft 120 for concurrent rotation therewith. An outer circumference 136 of the drive pulley 132 may engage the drive belt 134. Rotational torque received at the second pivot gear 118 causes the drive pulley 132 to rotate and move the slide 24 along the guide-rail 26. Rather than contacting the drive belt 134, the drive pulley 132 may alternately contact the drive-rail 98 directly. Although the drive-rail 98 is shown attached to the guide-rail 26, it may alternatively be configured as a separate component detached from the electric pallet conveyor 24.

The drive pulley 132 and drive belt 134 may include various features for maintaining traction between the drive pulley 132 and the drive belt 134. The type of features employed may depend in part on the force required to move the slide 24 along the guide-rail 26. For example, certain applications may require that the outer circumference 136 of the drive pulley 132 employ a rubber compound and the drive belt 134 include a similar rubber compound in order to maintain a desired traction between the drive pulley 132 and the drive belt 134. Other applications requiring more traction may utilize lugs 138 positioned on the outer circumference 136 of the drive pulley 132 that engage corresponding lugs 140 on the drive belt 134. The type and configuration of the traction features on the outer circumference 136 of the drive pulley 132 and the drive belt 134 may be varied to help ensure there is no slippage between the drive pulley 132 and the drive belt 134 when operating the slide rail system 20.

The drive belt 134 may have various configurations and be constructed from various materials and combination of materials. The drive belt 134 may be attached to the drive-rail 98 using various attachment mechanisms depending on the requirements of the particular application, as well as the configuration of the belt and/or the drive-rail. Attachment mechanisms that may be employed include, but are not limited to, adhesives, welding, brazing, soldering, rivets, screws, and bolts, as well as other attachment mechanisms. The drive belt 134 may be attached to the drive-rail 98 as a continuous uninterrupted strand or may include multiple lengths attached end-to-end.

With reference to FIG. 11, the pivot mechanism 96 may employ a biasing member 142, such as a spring, that operates to bias the drive pulley 132 into engagement with the drive belt 134. The biasing member 142 may have any of various configurations, including, but not limited to, a coil spring, an elastomeric material, a pneumatic, nitrogen or hydraulic spring, as well as other biasing devices.

Figure 6:
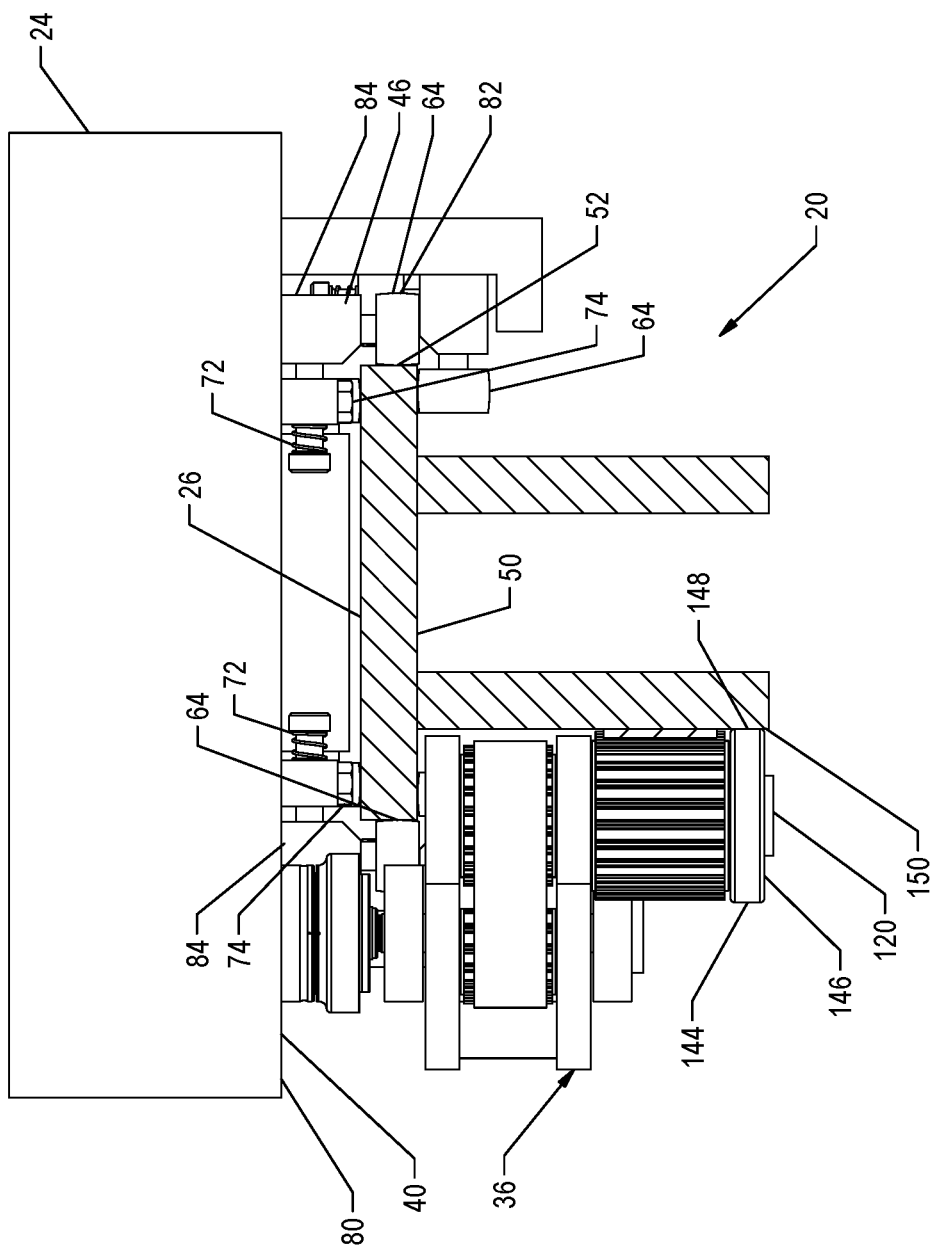
FIG. 6 is an end elevational view of the electric pallet conveyor system.

With reference to FIGS. 2, 6 and 8, the pivot mechanism 96 may employ a cam 144 to assist with tracking the drive pulley 132 along the drive belt 134 and to help control an engagement force between the drive pulley 132 and the drive belt 134. The cam 144 operates to help ensure a desired gap is maintained between the drive pulley 132 and the drive belt 134. It may also prevent the drive pulley 132 from being forceably jammed into the drive belt 134 as the slide 24 travels around a corner in the track 22. The cam 144 may include a cam bearing 146 having an inner race mounted on the drive shaft 120. An outer race 148 of the cam bearing 146 may engage a surface 150 of the drive-rail 98. The cam 144 may also have another configuration, such as a block, that slides along the surface 150 of the drive-rail. A suitable lubricant may be used to minimize friction between the cam and the surface 150 of the drive-rail 98.

What is claimed is:

1. An electric pallet conveyor comprising:
a track including a guide-rail and a drive-rail;
a slide moveably supported on the guide rail;

a motor attached to the slide;

a first gear pulley rotatably attached to the slide, the first gear pulley rotatable about a first gear pulley axis of rotation in response to a rotational torque output from the motor;

a second gear pulley rotatable about a second gear pulley axis of rotation;

a pulley belt connecting the first gear pulley to the second gear pulley; and a drive pulley attached to the second gear pulley for concurrent rotation therewith, the drive pulley engaging the drive-rail.

2. The electric pallet conveyor of claim 1, wherein the second drive pulley is pivotable about the first gear pulley axis of rotation.

3. The electric pallet conveyor of claim 2 further comprising a pivot arm pivotally connecting the second gear pulley to the slide.

4. The electric pallet conveyor of claim 3, wherein the pivot arm is pivotable about the first gear pulley axis of rotation.

5. The electric pallet conveyor of claim 4 further comprising a biasing member connected to the pivot arm, the biasing member operable for urging the drive pulley into contact with the drive-rail.

6. The electric pallet conveyor of claim 2, wherein the first gear pulley and the second gear pulley are rotatably connected to the pivot arm.

7. The electric pallet conveyor of claim 1 further comprising a cam follower attached to the pivot arm and engaging the drive-rail.

8. The electric pallet conveyor of claim 7, wherein the cam follower is rotatable about the second gear pulley axis of rotation.

9. The electric pallet conveyor of claim 7, wherein an outer diameter of the cam follower is greater than an outer diameter of the drive pulley.

10. The electric pallet conveyor of claim 1 further comprising a drive belt fixedly attached to the drive-rail, wherein the drive pulley engages the drive belt.

11. The electric pallet conveyor of claim 10, wherein the drive pulley includes lugs that engage corresponding lugs on the drive belt.

12. An electric pallet comprising:

a slide moveably connectable to a track;

a motor attached to the slide;

a first gear pulley rotatably connected to the slide, the first gear pulley rotatable about a first gear pulley axis of rotation in response to a rotational torque output from the motor;

a second gear pulley rotatable about a second gear pulley axis of rotation;

a pulley belt connecting the first gear pulley to the second gear pulley; and a drive pulley fixedly connected to the second gear pulley for concurrent rotation about the second gear pulley axis of rotation, the drive pulley engageable with the track.

13. The electric pallet of claim 12 further comprising a pivot arm pivotably connected to the slide and pivotable about a pivot axis, the first and second gear pulleys rotatably connected to the pivot arm.

14. The electric pallet of claim 13, wherein the pivot axis substantially coincides with the first gear pulley axis of rotation.

15. The electric pallet conveyor of claim 13 further comprising a biasing member engaging the pivot arm and operable for urging the drive pulley into engagement with the track.

16. The electric pallet of claim 13, wherein the pivot axis is located between the biasing member and the second gear pulley axis of rotation.

17. The electric pallet of claim 13 further comprising a cam follower attached to the pivot arm and engageable with the track.

18. The electric pallet of claim 17, wherein the cam follower is rotatable about the second gear pulley axis of rotation.

19. The electric pallet of claim 17, wherein an outer diameter of the cam follower is greater than an outer diameter of the drive pulley.

\* \* \* \* \*